US009593200B2

(12) United States Patent
Tanaka

(10) Patent No.: US 9,593,200 B2
(45) Date of Patent: Mar. 14, 2017

(54) THERMOPLASTIC POLYURETHANE AND A COMPOSITION THEREOF

(71) Applicant: KURARAY CO., LTD., Kurashiki-shi (JP)

(72) Inventor: Yusuke Tanaka, Kamisu (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 14/419,361

(22) PCT Filed: Aug. 5, 2013

(86) PCT No.: PCT/JP2013/071162
§ 371 (c)(1),
(2) Date: Feb. 3, 2015

(87) PCT Pub. No.: WO2014/024847
PCT Pub. Date: Feb. 13, 2014

(65) Prior Publication Data
US 2015/0210799 A1 Jul. 30, 2015

(30) Foreign Application Priority Data

Aug. 6, 2012 (JP) ................... 2012-173678
Nov. 29, 2012 (JP) ................... 2012-261216

(51) Int. Cl.
C08G 18/76 (2006.01)
C08G 18/66 (2006.01)
C08G 18/32 (2006.01)
C08G 18/48 (2006.01)
C08G 18/67 (2006.01)
C08G 18/40 (2006.01)
C08G 18/42 (2006.01)

(52) U.S. Cl.
CPC ..... *C08G 18/7671* (2013.01); *C08G 18/3206* (2013.01); *C08G 18/6674* (2013.01); *C08G 18/4018* (2013.01); *C08G 18/4238* (2013.01); *C08G 18/4854* (2013.01); *C08G 18/673* (2013.01); *C08G 2120/00* (2013.01)

(58) Field of Classification Search
USPC ....................................................... 525/453
See application file for complete search history.

(56) References Cited

U.S. PATENT DOCUMENTS

| 3,634,360 | A | * | 1/1972 | Wieden et al. ..... C08G 18/0814 264/184 |
| 4,202,957 | A | | 5/1980 | Bonk et al. |
| 4,376,834 | A | | 3/1983 | Goldwasser et al. |
| 5,043,472 | A | | 8/1991 | Mafoti |
| 5,109,034 | A | | 4/1992 | Mafoti |
| 6,180,244 | B1 | * | 1/2001 | Rayner ..................... B32B 7/12 428/354 |
| 6,406,788 | B1 | * | 6/2002 | Doi ..................... C08G 18/6484 156/284 |
| 6,995,231 | B2 | | 2/2006 | Onder |
| 2003/0139509 | A1 | | 7/2003 | Onder |
| 2010/0255317 | A1 | * | 10/2010 | Saito .................. C08G 18/0895 428/425.5 |
| 2012/0041141 | A1 | * | 2/2012 | Otomo ............... C08G 18/3206 524/588 |
| 2012/0123043 | A1 | * | 5/2012 | Nakamura ............... C08H 6/00 524/507 |

FOREIGN PATENT DOCUMENTS

| CN | 101875713 | 11/2010 |
| CN | 101875713 A | 11/2010 |
| JP | 51 52493 | 5/1976 |
| JP | 51- 52493 A | 5/1976 |
| JP | 58 79007 | 5/1983 |
| JP | 62 115019 | 5/1987 |
| JP | 62- 115019 A | 5/1987 |
| JP | 4 18415 | 1/1992 |
| JP | 7 179558 | 7/1995 |
| JP | 7 -179558 A | 7/1995 |
| JP | 8 283368 | 10/1996 |
| JP | 8- 283368 A | 10/1996 |
| JP | 2005 126595 | 5/2005 |
| JP | 2005-126595 A | 5/2005 |
| JP | 2010-155879 | 7/2010 |
| JP | 2011-68870 | 4/2011 |
| JP | 2011 236329 | 11/2011 |
| JP | 2011- 236329 A | 11/2011 |
| JP | 2013 141716 | 7/2013 |
| JP | 2013- 141716 A | 7/2013 |
| RU | 2263123 | 10/2005 |
| SU | 1297733 | 3/1987 |
| SU | 1611212 | 11/1990 |
| WO | 2011 024917 | 3/2011 |

OTHER PUBLICATIONS

International Search Report Issued Nov. 19, 2013 in PCT/JP13/071162 Filed Aug. 5, 2013.
Extended European Search Report issued Feb. 18, 2016 in Patent Application No. 13828217.3.

* cited by examiner

Primary Examiner — Mike M Dollinger
(74) Attorney, Agent, or Firm — Oblon, McClelland, Maier & Neustadt, L.L.P.

(57) ABSTRACT

The present invention provides a thermoplastic polyurethane obtained by reacting organic diisocyanate (A), polymer polyol (B) having a number average molecular weight (Mn) of 1000-5000 and chain extender (C), wherein the chain extender (C) contains a straight chain diol (c-1) and a side chain alkyl group-containing diol (c-2), a molar ratio of the straight chain diol (c-1) and the side chain alkyl group-containing diol (c-2) (straight chain diol (c-1)/side chain alkyl group-containing diol (c-2)) in the chain extender (C) is 97/3-60/40, and a nitrogen atom content is not less than 1.5 mass % and less than 4.0 mass %.

16 Claims, No Drawings

THERMOPLASTIC POLYURETHANE AND A COMPOSITION THEREOF

TECHNICAL FIELD

The present invention relates to a thermoplastic polyurethane, a thermoplastic polyurethane composition, and molded articles obtained therefrom.

BACKGROUND ART

Thermoplastic polyurethane is used in broad fields due to its superior elastic property, abrasion resistance and the like. For example, molded articles produced by extrusion molding such as film, sheet, tube, pipe and the like, various molded articles obtained by injection molding and the like are used for various applications in view of superior properties thereof.

Of those, polyether-based thermoplastic polyurethane is widely used for the aforementioned applications by utilizing the superior properties thereof such as hydrolysis resistance, cold resistance and the like.

As polyether-based thermoplastic polyurethane, thermoplastic polyurethane obtained by using, as a chain extender for the production of thermoplastic polyurethane, a combination of a chain extender having a different carbon atom number and a chain extender having a branch and the like is known, and the thermoplastic polyurethane is known to show good continuous productivity for a long time (see patent document 1).

DOCUMENT LIST

Patent Document patent document 1: JP-A-7-179558

SUMMARY OF THE INVENTION

Problems to be Solved by the Invention

However, the thermoplastic polyurethane described in patent document 1 has a room for further improvement in the transparency and cold resistance of the molded article. Moreover, the thermoplastic polyurethane shows a high thickening rate in melt retention, and has a problem that the torque of screw increases to prevent stable molding particularly in film molding requiring time for melt molding.

Due to these problems, the thermoplastic polyurethane cannot be used for functional films requiring transparency and the technical field requiring cold resistance, even though it has properties of abrasion resistance, mechanical strength and the like, and superior property of hydrolysis resistance.

The present invention has been made in view of the aforementioned situation, and provides a thermoplastic polyurethane superior in transparency and cold resistance, showing a small thickening rate even in melt retention for a long time, and further superior in abrasion resistance and mechanical property.

Means of Solving the Problems

Accordingly, the present invention relates to
[1] a thermoplastic polyurethane obtained by reacting organic diisocyanate (A),
polymer polyol (B) having a number average molecular weight (Mn) of 1000-5000 and
chain extender (C),
wherein the chain extender (C) comprises a straight chain diol (c-1) and a side chain alkyl group-containing diol (c-2),
a molar ratio of the straight chain diol (c-1) and the side chain alkyl group-containing diol (c-2) (straight chain diol (c-1)/side chain alkyl group-containing diol (c-2)) in the chain extender (C) is 97/3-60/40, and
a nitrogen atom content is not less than 1.5 mass % and less than 4.0 mass %;
[2] the thermoplastic polyurethane of the above-mentioned [1], wherein the proportion of the organic diisocyanate (A) is not more than 30 mass %;
[3] the thermoplastic polyurethane of the above-mentioned [1] or [2], wherein the organic diisocyanate (A) is 4,4'-diphenylmethane diisocyanate;
[4] the thermoplastic polyurethane of any of the above-mentioned [1]-[3], wherein the polymer polyol (B) is polyether polyol (b-1), or comprises polyether polyol (b-1) and other polyol (b-2), and
the molar ratio of the other polyol (b-2) and polyether polyol (b-1) (other polyol (b-2)/polyether polyol (b-1)) is 0/100-40/60;
[5] the thermoplastic polyurethane of the above-mentioned [4], wherein the other polyol (b-2) is polyester polyol;
[6] the thermoplastic polyurethane of the above-mentioned [5], wherein the polyol component constituting the polyester polyol is side chain alkyl group-containing diol (d);
[7] the thermoplastic polyurethane of the above-mentioned [6], wherein the side chain alkyl group-containing diol (d) is 3-methyl-1,5-pentanediol;
[8] the thermoplastic polyurethane of any of the above-mentioned [1]-[7], wherein the straight chain diol (c-1) is 1,4-butanediol, and
the side chain alkyl group-containing diol (c-2) is a diol represented by the following formula (I):

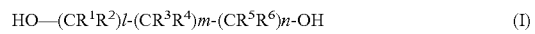

$$\text{HO—}(CR^1R^2)_l\text{-}(CR^3R^4)_m\text{-}(CR^5R^6)_n\text{-OH} \quad (I)$$

wherein $R^1$, $R^2$, $R^3$, $R^4$, $R^5$ and $R^6$ are each independently a hydrogen atom or an alkyl group, at least one of $R^1$, $R^2$, $R^3$, $R^4$, $R^5$ and $R^6$ is, an alkyl group, l, m and n are each independently an integer of not less than 0 that satisfies the relationships of $l+n \geq 1$ and $2 \leq l+m+n \leq 10$;
[9] the thermoplastic polyurethane of the above-mentioned [8], wherein the side chain alkyl group-containing diol (c-2) is at least one selected from the group consisting of propylene glycol, 3-methyl-1,5-pentanediol, 2-methyl-1,3-propanediol and 2-methyl-1,4-butanediol;
[10] the thermoplastic, polyurethane of the above-mentioned [8], wherein the side chain alkyl group-containing diol (c-2) is propylene glycol and/or 3-methyl-1,5-pentanediol;
[11] a molded article comprising the thermoplastic polyurethane of any of the above-mentioned [1]-[10];
[12] a thermoplastic polyurethane composition comprising the thermoplastic polyurethane of any of the above-mentioned [1]-[10], and
1-20 parts by mass of a crosslinking agent relative to 100 parts by mass of the thermoplastic polyurethane;
[13] a molded article comprising the thermoplastic polyurethane composition of the above-mentioned [12]; and
[14] a crosslinked molded article obtained by crosslinking the molded article of the above-mentioned [13].

Effect of the Invention

According to the present invention, a thermoplastic polyurethane superior in transparency and cold resistance, showing a small thickening rate even in melt retention for a long time, and further superior in abrasion resistance and mechanical property can be provided.

DESCRIPTION OF EMBODIMENTS

The thermoplastic polyurethane of the present invention is a thermoplastic polyurethane obtained by reacting organic diisocyanate (A), polymer polyol (B) having a number average molecular weight (Mn) of 1000-5000 and chain extender (C), which is characterized in that the chain extender (C) comprises a straight chain diol (c-1) and a side chain alkyl group-containing diol (c-2), a molar ratio of the straight chain diol (c-1) and the side chain alkyl group-containing diol (c-2) (straight chain diol (c-1)/side chain alkyl group-containing diol (c-2)) in the chain extender (C) is 97/3-60/40, and a nitrogen atom content is not less than 1.5 mass % and less than 4.0 mass. The "straight chain diol" means a compound wherein a linear main chain (preferably alkanediyl group) has a hydroxyl group at both ends, and the "side chain alkyl group-containing diol" means a compound wherein an alkyl group is bound as a side chain to the aforementioned straight chain diol. The number of the carbon atoms of the main chain of the straight chain diol and side chain alkyl group-containing diol is preferably not less than two and not more than 10.

[Organic Diisocyanate (A)]

The organic diisocyanate (A) to be used in the present invention can be any organic diisocyanate conventionally used for the production of thermoplastic polyurethane. Examples of the organic diisocyanate (A) include aromatic diisocyanate such as 4,4'-diphenylmethane diisocyanate, tolylene diisocyanate, 1,5-naphthylene diisocyanate, xylylene diisocyanate, phenylene diisocyanate, 3,3'-dichloro-4,4'-diphenylmethane diisocyanate, toluylene diisocyanate and the like; aliphatic or alicyclic diisocyanate such as hexamethylene diisocyanate, isophorone diisocyanate, 4,4'-dicyclohexylmethane diisocyanate, hydrogenated xylylene diisocyanate and the like. Only one kind of these may be used, or two or more kinds thereof may be used in combination. Among these, from the aspects of dynamics property, moldability and durability of the thermoplastic polyurethane to be obtained, and the like, aromatic diisocyanate is preferable, and 4,4'-diphenylmethane diisocyanate is more preferable.

[Polymer Polyol (B)]

The polymer polyol (B) to be used in the present invention is a polymer polyol having a number average molecular weight (Mn) of 1000-5000. When Mn of polymer polyol (B) is less than 1000, the obtained thermoplastic polyurethane shows decreased cold resistance and impact resistance and it becomes fragile. When Mn is more than 5000, the moldability of the obtained thermoplastic polyurethane decreases. Mn of the polymer polyol (B) is preferably 1000-4000, more preferably 1500-3000. Mn can be calculated from a hydroxyl value measured according to JIS K 1557.

The polymer polyol (B) is preferably composed of polyether polyol (b-1), and may contain other polyol (b-2) as necessary. The polyether polyol (b-1) is preferably a linear polyether polyol, more preferably a linear polyether diol. Mn of the polyether polyol (b-1) is 1000-5000, preferably 1000-4000, more preferably 1500-3000. When Mn of the polyether polyol (b-1) is less than 1000, the obtained thermoplastic polyurethane shows decreased cold resistance and impact resistance and it becomes fragile. On the other hand, when Mn is more than 5000, the moldability of the obtained thermoplastic polyurethane decreases.

Examples of the polyether polyol (b-1) include polyethylene glycol, poly(trimethylene ether) glycol, poly(tetramethylene ether) glycol, poly(hexamethylene ether) glycol and the like. Among these, poly(tetramethylene ether) glycol is preferable from the aspects of dynamics property, moldability and cold resistance of thermoplastic polyurethane to be obtained.

Mn of the other polyol (b-2) is 1000-5000, preferably 1000-4000, more preferably 1500-3000. When Mn of the other polyol (b-2) is less than 1000, the obtained thermoplastic polyurethane shows decreased cold resistance and impact resistance and it becomes fragile. On the other hand, when Mn is more than 5000, the moldability of the obtained thermoplastic polyurethane decreases.

Examples of the other polyol (b-2) include polyester polyol obtained from aliphatic polycarboxylic acid and aliphatic polyol (e.g., polyester diol obtained from aliphatic dicarboxylic acid and aliphatic diol); polyester polyol obtained from aliphatic polycarboxylic acid, aromatic polycarboxylic acid and aliphatic polyol (e.g., polyester diol obtained from aliphatic dicarboxylic acid, aromatic dicarboxylic acid and aliphatic diol); polycaprolactone polyol (e.g., polycaprolactone diol); polycarbonate polyol (e.g., polycarbonate diol); and the like. Among these, polyester polyol (i.e., polyester polyol obtained from aliphatic polycarboxylic acid and aliphatic polyol, and polyester polyol obtained from aliphatic polycarboxylic acid, aromatic polycarboxylic acid and aliphatic polyol) is preferable from the aspects of availability and suppression of the thickening rate of the thermoplastic polyurethane to be obtained during melt retention, polyester polyol obtained from aliphatic polycarboxylic acid and aliphatic polyol is more preferable, and polyester diol obtained from aliphatic dicarboxylic acid and aliphatic diol is particularly preferable.

The aforementioned polyester polyol can be obtained by, for example, the following methods and the like:

(1) a method including a direct esterification reaction or a transesterification reaction of a polyol component and a polycarboxylic acid component such as ester-formable derivatives (e.g., polycarboxylic acid, an ester thereof, an acid anhydride thereof and the like) and the like, and (2) a method including ring opening polymerization of lactone by using a polyol component as an initiator.

As a polyol component to be used for the production of polyester polyol, those generally used for the production of polyester can be used. Examples of the polyol component include divalent alcohols (i.e., diol) such as straight chain diols such as ethylene glycol, diethylene glycol, triethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol and the like; side chain alkyl group-containing diols (d) such as propylene glycol, 1-ethyl-1,2-ethanediol, 1,2-dimethyl-1,2-ethanediol, 1-methyl-2-ethyl-1,2-ethanediol, 1-methyl-1,3-propanediol, 2-methyl-1,3-propanediol, 1,2-dimethyl-1,2-propanediol, 1,3-dimethyl-1,3-propanediol, 2,2-dimethyl-1,3-propanediol, 2,2-diethyl-1,3-propanediol, 2-ethyl-2-butyl-1,3-propanediol, 1-methyl-1,4-butanediol, 2-methyl-1,4-butanediol, 2,3-dimethyl-1,4-butanediol, 2-methyl-1,5-pentanediol, 3-methyl-1,5-pentanediol, 2-ethyl-1,5-pentanediol, 3-ethyl-1,5-pentanediol, 2,4-dimethyl-1,5-pentanediol, 3-methyl-1,6-hexanediol, 2-methyl-1,8-octanediol, 2,7-dimethyl-1,8-octanediol, 2-methyl-1,9-nonanediol, 2,8-dimethyl-1,9-nonanediol and the like; alicyclic diols such as 1,4-cyclohexanediol, cyclohexane dimethanol (e.g., 1,4-cyclohexane dimethanol), cyclooctane dimethanol (e.g., 1,5-cyclooctane dimethanol), dimethylcyclooctane dimethanol (e.g., 2,6-dimethyl-1,5-cyclooctane dimethanol) and the like; aromatic diols such as 1,4-bis(p-hydroxyethoxy)benzene and the like, and the like; and polyvalent alcohols such as trimethylolpropane, trimethylolethane, glycerol, 1,2,6-hexanetriol, pentaerythritol, diglycerol and the like. Only one kind of these may be used, or two or more kinds thereof may be used in combination.

As the aforementioned polyol component, divalent alcohol (i.e., diol) is preferable, the aforementioned side chain alkyl group-containing diol (d) is more preferable since the obtained thermoplastic polyurethane is superior in cold resistance and transparency, and 3-methyl-1,5-pentanediol is further preferable from the aspects of availability of the starting materials and water resistance of the obtained thermoplastic polyurethane.

As the polycarboxylic acid component to be used for the production of polyester polyol, a polycarboxylic acid component generally used for the production of polyester can be used. Examples of the polycarboxylic acid component include aliphatic dicarboxylic acid having 4-12 carbon atoms (preferably 6-12 carbon atoms) such as succinic acid, glutaric acid, adipic acid, pimelic acid, suberic acid, azelaic acid, sebacic acid, dodecanedioic acid, methylsuccinic acid, 2-methylglutaric acid, 3-methylglutaric acid, trimethyladipic acid (e.g., 2,2,4-trimethyladipic acid), 2-methyloctanedioic acid, 3,8-dimethyldecanedioic acid, 3,7-dimethyldecanedioic acid and the like; alicyclic dicarboxylic acid such as cyclohexanedicarboxylic acid (e.g., 1,4-cyclohexanedicarboxylic acid), dimer acid, hydrogenated dimer acid and the like; aromatic dicarboxylic acid such as terephthalic acid, isophthalic acid, orthophthalic acid, naphthalenedicarboxylic acid and the like; 3 or more functional polycarboxylic acids such as trimellitic acid, pyromellitic acid and the like; ester-formable derivatives thereof; and the like. Only one kind from these polycarboxylic acids and ester-formable derivatives may be used, or two or more kinds thereof may be used in combination. Among these, aliphatic dicarboxylic acid having 6-12 carbon atoms, particularly adipic acid, azelaic acid or sebacic acid is preferable.

As the polyester polyol, polyester diol obtained by reacting aliphatic dicarboxylic acid having 4-12 carbon atoms with side chain alkyl group-containing diol (d) is preferable, polyester diol obtained by reacting aliphatic dicarboxylic acid having 6-12 carbon atoms with side chain alkyl group-containing diol (d) is more preferable, and polyester diol obtained by reacting at least one selected from the group consisting of adipic acid, azelaic acid and sebacic acid with 3-methyl-1,5-pentanediol is further preferable.

Examples of the lactone to be used for the production of polyester polyol obtained by ring opening polymerization of lactone include ε-caprolactone, β-methyl-δ-valerolactone and the like.

Examples of polycarbonate polyol include those obtained by reacting polyol with carbonate compounds such as dialkylcarbonate, alkylenecarbonate, diarylcarbonate and the like.

As polyol constituting polycarbonate polyol, the polyol components recited above as examples of the components to be used for the production of polyester polyol can be used. As dialkylcarbonate, dimethylcarbonate, diethylcarbonate and the like can be mentioned, as alkylenecarbonate, ethylenecarbonate and the like can be mentioned, and as diarylcarbonate, diphenylcarbonate and the like can be mentioned.

The molar ratio of other polyol (b-2) and polyether polyol (b-1) (other polyol (b-2)/polyether polyol (b-1)) is preferably 0/100-40/60, more preferably 0/100-30/70.

[Chain Extender (C)]

The chain extender (C) to be used in the present invention is a mixture of straight chain diol (c-1) and side chain alkyl group-containing diol (c-2). In the present invention, the molar ratio of straight chain diol (c-1) and side chain alkyl group-containing diol (c-2) (straight chain diol (c-1)/side chain alkyl group-containing diol (c-2)) needs to be 97/3-60/40. This molar ratio is preferably 95/5-80/20. When the proportion of side chain alkyl group-containing diol (c-2) in the total of straight chain diol (c-1) and side chain alkyl group-containing diol (c-2) is less than 3 mol %, an improving effect on the transparency and cold resistance of the obtained thermoplastic polyurethane becomes small, and when this proportion exceeds 40 mol %, the breaking strength and the like of the obtained molded articles become low.

Examples of straight chain diol (c-1) include ethylene glycol, diethylene glycol, triethylene glycol, 1,3-propanediol, 1,4-butanediol, 1,5-pentanediol, 1,6-hexanediol, 1,9-nonanediol and the like. Only one kind of these may be used, or two or more kinds thereof may be used in combination. Among these, 1,4-butanediol is preferable from the aspects of dynamics property and moldability of thermoplastic polyurethane to be obtained.

Examples of side chain alkyl group-containing diol (c-2) include a diol represented by the following formula (I):

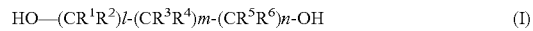

$$HO—(CR^1R^2)_l-(CR^3R^4)_m-(CR^5R^6)_n-OH \quad (I)$$

wherein $R^1$, $R^2$, $R^3$, $R^4$, $R^5$ and $R^6$ are each independently a hydrogen atom or an alkyl group, at least one of $R^1$, $R^2$, $R^3$, $R^4$, $R^5$ and $R^6$ is an alkyl group, and l, m and n are each independently an integer of not less than 0 that satisfies the relationships of $l+n \geq 1$ and $2 \leq l+m+n \leq 10$. Specific examples thereof are the same as the aforementioned side chain alkyl group-containing diol (d) and the like. Only one kind of side chain alkyl group-containing diol (c-2) may be used, or two or more kinds thereof may be used in combination. Among these, propylene glycol, 3-methyl-1,5-pentanediol, 2-methyl-1,3-propanediol and 2-methyl-1,4-butanediol are preferable, propylene glycol and 3-methyl-1,5-pentanediol are more preferable, and 3-methyl-1,5-pentanediol is further preferable, from the aspects of cold resistance and transparency of the thermoplastic polyurethane to be obtained.

In the present invention, other low-molecular-weight compound having two or more hydroxyl groups, which is capable of reacting with an isocyanate group (alias: isocyanato group), may be used as necessary as chain extender (C), together with the aforementioned straight chain diol (c-1) and side chain alkyl group-containing diol (c-2), as long as the effect of the invention is not impaired. Examples of the other low-molecular-weight compound include 3 or more functional low-molecule polyols such as glycerol, pentaerythritol and the like.

[Thermoplastic Polyurethane]

The thermoplastic polyurethane of the present invention needs to have a nitrogen atom content of not less than 1.5 mass % and less than 4.0 mass %. The nitrogen atom content is preferably 1.5-3.2 mass %, more preferably 2.0-2.8 mass %. When the nitrogen atom content of the thermoplastic polyurethane is less than 1.5 mass %, the dynamics property and durability may sometimes become inferior, and when it is not less than 4.0 mass %, the cold resistance and transparency decrease, and further, thickening becomes marked during melt retention, and long-time melt molding becomes difficult.

For the production of the thermoplastic polyurethane of the present invention, the aforementioned organic diisocyanate (A) is preferably used such that an isocyanate group is about 0.9-1.5 equivalents per 1 equivalent of all active hydrogen atoms (hydrogen atom capable of reacting with isocyanate) possessed by the aforementioned polymer polyol (B), the aforementioned chain extender (C) and other components, and organic diisocyanate (A) is particularly preferably used such that the isocyanate group is about 1 equivalent.

The proportion of organic diisocyanate (A) in the thermoplastic polyurethane of the present invention (i.e., total of organic diisocyanate (A), polymer polyol (B) and chain extender (C)) is preferably not more than 30 mass % from the aspects of cold resistance, transparency, and thickening rate during melt retention of the thermoplastic polyuretane to be obtained. The proportion of the organic diisocyanate (A) is more preferably not more than 27 mass %.

From the aspects of dynamic property, moldability, durability and the like, the thermoplastic polyurethane of the present invention preferably has a logarithmic viscosity of 0.5-2.0 dl/g when measured as a 0.5 g/dl dimethylformamide solution at 30° C. The kind and combination of the starting material components, polymerization conditions and the like are preferably selected to afford a thermoplastic polyurethane having such viscosity.

The number average molecular weight (Mn) of thermoplastic polyurethane is preferably 50,000-500,000, more preferably 100,000-300,000. When Mn of thermoplastic polyurethane is less than 50,000, the dynamic property and durability of the thermoplastic polyurethane decrease, and when Mn is more than 500,000, the moldability becomes poor. Mn of thermoplastic polyurethane can be measured by gel penetration chromatography (GPC). The GPC can be measured using a differential refractometer detector ("RID6A" manufactured by Shimadzu Corporation) and high performance liquid chromatography (HPLC) ("LC-9A" manufactured by Shimadzu Corporation, column: "Shodex KD-806M" and "Shodex KD-802.5" manufactured by Tosoh Corporation are connected, eluent: dimethyl formamide, standard sample: polystyrene).

In preferable thermoplastic polyurethane,
organic diisocyanate (A) is aromatic diisocyanate,
polymer polyol (B) is polyether polyol (b-1) having Mn of 1000-5000, or comprises polyether polyol (b-1) having Mn of 1000-5000 and other polyol (b-2) having Mn of 1000-5000,
the molar ratio of other polyol (b-2) and polyether polyol (b-1) (other polyol (b-2)/polyether polyol (b-1)) is 0/100-40/60,
polyether polyol (b-1) is at least one selected from the group consisting of polyethylene glycol, poly(trimethylene ether) glycol, poly(tetramethylene ether) glycol and poly(hexamethylene ether) glycol,
other polyol (b-2) is a polyester diol obtained by reacting aliphatic dicarboxylic acid having 4-12 carbon atoms with at least one selected from the group consisting of propylene glycol, 1-ethyl-1,2-ethanediol, 1,2-dimethyl-1,2-ethanediol, 1-methyl-2-ethyl-1,2-ethanediol, 1-methyl-1,3-propanediol, 2-methyl-1,3-propanediol, 1,2-dimethyl-1,2-propanediol, 1,3-dimethyl-1,3-propanediol, 2,2-dimethyl-1,3-propanediol, 2,2-diethyl-1,3-propanediol, 2-ethyl-2-butyl-1,3-propanediol, 1-methyl-1,4-butanediol, 2-methyl-1,4-butanediol, 2,3-dimethyl-1,4-butanediol, 2-methyl-1,5-pentanediol, 3-methyl-1,5-pentanediol, 2-ethyl-1,5-pentanediol, 3-ethyl-1,5-pentanediol, 2,4-dimethyl-1,5-pentanediol, 3-methyl-1,6-hexanediol, 2-methyl-1,8-octanediol, 2,7-dimethyl-1,8-octanediol, 2-methyl-1,9-nonanediol and 2,8-dimethyl-1,9-nonanediol, chain extender (C) comprises straight chain diol (c-1) and side chain alkyl group-containing diol (c-2),
the molar ratio of straight chain diol (c-1) and side chain alkyl group-containing diol (c-2) is 97/3-60/40,
straight chain diol (c-1) is at least one selected from the group consisting of ethylene glycol, diethylene glycol, triethylene glycol, 1,3-propanediol, 1,4-butanediol, 1,5-pentanediol, 1,6-hexanediol and 1,9-nonanediol,
side chain alkyl group-containing diol (c-2) is at least one selected from the group consisting of propylene glycol, 1-ethyl-1,2-ethanediol, 1,2-dimethyl-1,2-ethanediol, 1-methyl-2-ethyl-1,2-ethanediol, 1-methyl-1,3-propanediol, 2-methyl-1,3-propanediol, 1,2-dimethyl-1,2-propanediol, 1,3-dimethyl-1,3-propanediol, 2,2-dimethyl-1,3-propanediol, 2,2-diethyl-1,3-propanediol, 2-ethyl-2-butyl-1,3-propanediol, 1-methyl-1,4-butanediol, 2-methyl-1,4-butanediol, 2,3-dimethyl-1,4-butanediol, 2-methyl-1,5-pentanediol, 3-methyl-1,5-pentanediol, 2-ethyl-1,5-pentanediol, 3-ethyl-1,5-pentanediol, 2,4-dimethyl-1,5-pentanediol, 3-methyl-1,6-hexanediol, 2-methyl-1,8-octanediol, 2,7-dimethyl-1,8-octanediol, 2-methyl-1,9-nonanediol and 2,8-dimethyl-1,9-nonanediol,
the nitrogen content of the thermoplastic polyurethane is not less than 1.5 mass % and less than 4.0 mass %, and
Mn of the thermoplastic polyurethane is 50,000-500,000.

In more preferable thermoplastic polyurethane,
organic diisocyanate (A) is aromatic diisocyanate,
polymer polyol (B) is polyether polyol (b-1) having Mn of 1000-4000, or comprises polyether polyol (b-1) having Mn of 1000-4000 and other polyol (b-2) having Mn of 1000-4000,
the molar ratio of other polyol (b-2) and polyether polyol (b-1) is 0/100-30/70,
polyether polyol (b-1) is at least one selected from the group consisting of polyethylene glycol, poly(trimethylene ether) glycol, poly(tetramethylene ether) glycol and poly(hexamethylene ether) glycol,
other polyol (b-2) is polyester diol obtained by reacting aliphatic dicarboxylic acid having 6-12 carbon atoms with 3-methyl-1,5-pentanediol,
chain extender (C) comprises straight chain diol (c-1) and side chain alkyl group-containing diol (c-2),
the molar ratio of straight chain diol (c-1) and side chain alkyl group-containing diol (c-2) is 95/5-80/20,
straight chain diol (c-1) is at least one selected from the group consisting of ethylene glycol, diethylene glycol, triethylene glycol, 1,3-propanediol, 1,4-butanediol, 1,5-pentanediol, 1,6-hexanediol and 1,9-nonanediol,
side chain alkyl group-containing diol (c-2) is at least one selected from the group consisting of propylene glycol, 3-methyl-1,5-pentanediol, 2-methyl-1,3-propanediol and 2-methyl-1,4-butanediol,
the nitrogen content of the thermoplastic polyurethane is 1.5-3.2 mass %, and
Mn of the thermoplastic polyurethane is 50,000-500,000.

In further preferable ethermoplastic polyurethane,
organic diisocyanate (A) is 4,4'-diphenylmethane diisocyanate,
polymer polyol (B) is polyether polyol (b-1) having Mn of 1500-3000, or comprises polyether polyol (b-1) having Mn of 1500-3000 and other polyol (b-2) having Mn of 1500-3000,
the molar ratio of other polyol (b-2) and polyether polyol (b-1) is 0/100-30/70,
polyether polyol (b-1) is poly(tetramethylene ether) glycol, other polyol (b-2) is polyester diol obtained by reacting at least one selected from the group consisting of adipic acid, azelaic acid and sebacic acid with 3-methyl-1,5-pentanediol, chain extender (C) comprises straight chain diol (c-1) and side chain alkyl group-containing diol (c-2), the molar ratio of straight chain diol (c-1) and side chain alkyl group-containing diol (c-2) is 95/5-80/20, straight chain diol (c-1) is 1,4-butanediol, side chain alkyl group-containing diol (c-2) is propylene glycol and/or 3-methyl-1,5-pentanediol, the nitrogen content of the thermoplastic polyurethane is 2.0-2.8 mass %, and Mn of the thermoplastic polyurethane is 50,000-500,000.

[Thermoplastic Polyurethane Composition]

The present invention provides a thermoplastic polyurethane composition containing the aforementioned thermoplastic polyurethane and other components. The other component is not particularly limited as long as it is a component generally used for the production of the thermoplastic polyurethane composition. Examples thereof include internal mold release agent, filler, plasticizer, colorant (dye, pigment), stabilizer (e.g., antioxidant, UV stabilizer, heat stabilizer etc.), flame-retardant, crosslinking agent, reaction promoter, reinforcing agent and the like.

Examples of the internal mold release agent include fatty acid amide, fatty acid ester, fatty acid, fatty acid salt and the like. Examples of the fatty acid amide include caproic amide, lauric amide, myristic amide, stearic amide, oleic amide, ethylene bis(stearic amide), ethylene bis(oleic amide) and the like. Examples of the fatty acid ester include ester of long chain fatty acid and alcohol and the like, and specific examples thereof include sorbitan monolaurate, butyl stearate, butyl laurate, octyl palmitate, stearyl stearate and the like. Examples of the fatty acid include capric acid, lauric acid, myristic acid, palmitic acid, stearic acid, montanic acid, linderic acid, oleic acid, erucic acid, linoleic acid and the like. Examples of the fatty acid salt include metal (e.g., barium, zinc, magnesium, calcium etc.) salt of the aforementioned fatty acid.

Examples of the filler include talc, calcium carbonate, chalk, calcium sulfate, clay, kaolin, silica, glass, fumed silica, mica, wollastonite, feldspar, aluminum silicate, calcium silicate, alumina, alumina hydrate such as alumina trihydrate and the like, glass microsphere, ceramic microsphere, thermoplastic resin microsphere, barite, wood flour, glass fiber, carbon fiber, marble dust, cement dust, magnesium oxide, magnesium hydroxide, antimony oxide, zinc oxide, barium sulfate, titanium, dioxide, titanate, these combination and the like. The filler is preferably talc, calcium carbonate, barium sulfate, silica, glass, glass fiber, alumina, titanium dioxide or a combination of these, and more preferably talc, calcium carbonate, barium sulfate, glass fiber or a combination of these. As the filler, those described in a document of Zweifel Hans et al., "Plastics Additives Handbook" Hanser Gardner Publications, Cincinnati, Ohio, edition 5, chapter 17, pp. 901-948 (2001) can be used.

Examples of the plasticizer include mineral oil, abietate, adipate, alkylsulfonate, azelaate, benzoate, chlorinated paraffin, citrate, epoxide, glycol ether and ester thereof, glutarate, hydrocarbon oil, isobutyrate, oleate, pentaerythritol derivative, phosphate, phthalate, polybutene, ricinoleate, sebacate, sulfonamide, trimellitate, pyromellitate, biphenyl derivative, stearate, difuran diester, fluorine containing plasticizer, hydroxybenzoate, isocyanate adduct, polycyclic aromatic compound, natural product derivative, siloxane-based plasticizer, tar-based product, thioester, thioether, combinations of these and the like. The content of the plasticizer in the thermoplastic polyurethane composition is preferably 0-15 mass, more preferably 0.5-10 mass %, further preferably 1-5 mass %. As the plasticizer, those described in a document of George Wypych, "Handbook of Plasticizers" ChemTec Publishing, Toronto-Scarborough, Ontario (2004) can be used.

Examples of the colorant (dye, pigment) include inorganic pigments, for example, metal oxide (e.g., iron oxide, zinc oxide, titanium dioxide), mixed metal oxide, carbon black, combinations of these and the like; organic pigments, for example, anthraquinone, anthanthrone, azo compound, monoazo compound, arylamide, benzimidazolone, BONA lake, diketo pyrrolo pyrrole, dioxazin, disazo compound, diallylide compound, flavanthrone, indanthrone, isoindolinone, isoindoline, monoazo salt, naphthol, β-naphthol, naphthol AS, naphthol lake, perylene, perinone, phthalocyanine, pyranthrone, quinacridone, quinophthalone, combinations of these and the like; combination of inorganic pigment and organic pigment; and the like. The content of the colorant in the thermoplastic polyurethane composition is preferably 0-10 mass %, more preferably 0.1-5 mass %, further preferably 0.25-2 mass %. As the colorant, those described in a document of Zweifel Hans et al., "Plastics Additives Handbook" Hanser Gardner Publications, Cincinnati, Ohio, edition 5, chapter 15, pp. 813-882 (2001) can be used.

Examples of the antioxidant include aromatic amine or hindered amine such as alkyldiphenylamine, phenyl-α-naphthylamine, alkyl-substituted phenyl-α-naphthylamine, aralkyl-substituted phenyl-α-naphthylamine, alkylated p-phenylenediamine, tetramethyl-diaminodiphenylamine and the like; phenol compound such as 2,6-di-t-butyl-4-methylphenol and the like; 1,3,5-trimethyl-2,4,6-tris(3',5'-di-t-butyl-4'-hydroxybenzyl)benzene; tetrakis[(methylene (3,5-di-t-butyl-4-hydroxyhydrocinnamate)]methane (e.g., IRGANOX (trademark) 1010, manufactured by Ciba Specialty Chemicals); acryloyl-modified phenol; octadecyl-3,5-di-t-butyl-4-hydroxycinnamate (e.g., IRGANOX(trademark)1076, manufactured by Ciba Specialty Chemicals); phosphite; phosphonite; hydroxylamine; benzofuranone derivative; combinations of these; and the like. The content of the antioxidant in the thermoplastic polyurethane composition is preferably 0-5 mass %, more preferably 0.0001-2.5 mass %, further preferably 0.001-1 mass %, particularly preferably 0.001-0.5 mass %. As the antioxidant, those described in a document of Zweifel Hans et al., "Plastics Additives Handbook" Hanser Gardner Publications, Cincinnati, Ohio, edition 5, chapter 1, pp. 1-140 (2001) can be used.

Examples of the UV stabilizer include benzophenone, benzotriazole, arylester, oxanilide, (meth)acrylate, formamidine, carbon black, hindered amine, nickel quencher, hindered amine, phenol compound, metal salt, zinc compound, combinations of these and the like. The content of the UV stabilizer in the thermoplastic polyurethane composition is preferably 0-5 mass %, more preferably 0.01-3 mass %, further preferably 0.1-2 mass %, and particularly preferably 0.1-1 mass %. As the UV stabilizer, those described in a document of Zweifel Hans et al., "Plastics Additives Handbook" Hanser Gardner Publications, Cincinnati, Ohio, edition 5, chapter 2, pp. 141-426 (2001) can be used.

To improve heat stability of the thermoplastic polyurethane in molding processing, a heat stabilizer may be used. Examples of the heat stabilizer include phosphorus heat stabilizer, and examples of the commercially available product thereof include trade name: IRGAFOS 38, IRGAFOS 126, IRGAFOS P-EPQ and the like manufactured by Ciba Specialty Chemicals, and trade name: Adekastab PEP-4C, Adekastab 11C, Adekastab 24, Adekastab 36 and the like manufactured by Asahi Denka Kogyo. When a phosphorus heat stabilizer is used, the content thereof in the thermoplastic polyurethane composition is preferably 0.05-1 mass %.

Examples of the flame-retardant include halogen-containing organic flame-retardant such as polybromodiphenyl ether, ethylene bis(brominated phthalimido), bis(brominated phenyl)ethane, bis(brominated phenyl)terephthalamide, perchloropentacyclodecane and the like; phosphorus organic flame-retardant; nitrogen-containing organic flame-retardant; inorganic flame-retardant such as antimony trioxide, aluminum hydroxide, magnesium hydroxide and the like; and the like.

The thermoplastic polyurethane composition of the present invention preferably contains a crosslinking agent. A crosslinked molded article having various good properties such as dynamics property, abrasion resistance and the like can be obtained by crosslinking after molding a thermoplastic polyurethane composition containing a crosslinking agent.

Examples of the crosslinking agent include organic peroxide such as alkylperoxide, arylperoxide, peroxyester, peroxycarbonate, diacylperoxide, peroxyketal, cyclic peroxide and the like; silane compound such as vinyltrimethoxysilane, vinyltriethoxysilane, vinyltris(2-methoxyethoxy)silane, vinyltriacetoxysilane, vinylmethyldimethoxysilane, 3-methacryloyloxypropyltrimethoxysilane and the like; radical crosslinking agent having plural (preferably 3 or more) carbon-carbon double bonds in a molecule such as trimethylolpropane triacrylate, trimethylolpropane trimethacrylate, triacryl formal and the like, and the like. As the crosslinking agent, those described in a document of Zweifel Hans et al., "Plastics Additives Handbook" Hanser Gardner Publications, Cincinnati, Ohio, edition 5, chapter 14, pp. 725-812 (2001) can be used. Among these, a radical crosslinking agent is preferable, trimethylolpropane triacrylate, trimethylolpropane trimethacrylate and triacryl formal are more preferable, and trimethylolpropane triacrylate and trimethylolpropane trimethacrylate are further preferable.

When a radical crosslinking agent is used, the content of the radical crosslinking agent in the thermoplastic polyurethane composition is preferably 1-20 parts by mass, more preferably 2-15 parts by mass, relative to 100 parts by mass of the thermoplastic polyurethane. When the content of the radical crosslinking agent exceeds 20 parts by mass, the viscosity of the thermoplastic polyurethane composition decreases, the moldability decreases, and handling sometimes becomes difficult. In addition, when the content of the radical crosslinking agent is less than 1 part by mass, various properties of a crosslinked molded article such as dynamic property, abrasion resistance and the like may not sometimes be improved sufficiently.

[Production Method of Thermoplastic Polyurethane]

The thermoplastic polyurethane of the present invention can be produced by a known urethanation reaction technique, and can also be produced by any of the prepolymer method and the one-shot method. Examples thereof include (1) a method of producing thermoplastic polyurethane including continuously supplying polymer polyol (B), chain extender (C), organic diisocyanate (A) and other components as necessary simultaneously or almost simultaneously into a single screw or multiple screw extruder and performing continuous melt polymerization at 60-280° C., preferably 200-260° C.;

(2) a method of producing thermoplastic polyurethane including mixing polymer polyol (B) and active hydrogen atom-containing compounds such as chain extender (C) and the like, heating the mixture to 60-90° C., adding organic diisocyanate (A) in an amount that makes the molar ratio of an active hydrogen atom and an isocyanate group (active hydrogen atom/isocyanate group) in the mixture of these 1/1-1/1.5, stirring the mixture for a short time, and heating to 200-260° C.;

(3) a method of producing thermoplastic polyurethane including reacting organic diisocyanate (A) with polymer polyol (B) in advance in an extruder or other reaction apparatus to form an isocyanate group-terminal prepolymer and reacting chain extender (C);

(4) a method of producing thermoplastic polyurethane in an organic solvent including adding polymer polyol (B), chain extender (C), organic diisocyanate (A) and other components as necessary to the organic solvent;

and the like. When a thermoplastic polyurethane superior in melt moldability and dynamics property is to be produced, melt polymerization substantially in the absence of a solvent is preferable, and a continuous melt polymerization method using a multiple screw extruder is more preferable. The thermoplastic polyurethane obtained by the continuous melt polymerization method is generally superior in the strength as compared to that obtained by solid phase polymerization at 80-130° C. In addition, the method of (1) is preferable since it can continuously produce the object thermoplastic polyurethane extremely easily by merely supplying all reaction components into an extruder simultaneously or almost simultaneously.

A catalyst may be used for a urethanation reaction. Examples of the urethanation reaction catalyst include organotin compound, organozinc compound, organobismuth compound, organotitanium compound, organozirconium compound, amine compound and the like. Only one kind of the urethanation reaction catalyst may be used, or two or more kinds thereof may be used in combination. When a urethanation reaction catalyst is used, it is recommended to be adjusted to 0.1-100 mass ppm relative to the mass of the thermoplastic polyurethane. When not less than 0.1 mass ppm of a urethanation reaction catalyst is used, the original molecular weight is maintained at a sufficiently high level even after molding the thermoplastic polyurethane, and even a molded article can effectively exert the inherent properties of the thermoplastic polyurethane with ease.

Among the aforementioned urethanation reaction catalysts, an organotin compound is preferable. Examples of the organotin compound include tin-containing acylate compound, tin-containing mercaptocarboxylic acid salt and the like. Specific examples thereof include tin octylate, monomethyltin mercaptoacetate, monobutyltin triacetate, monobutyltin monooctylate, monobutyltin monoacetate, monobutyltin maleate, monobutyltin maleic acid benzyl ester salt, monooctyltin maleate, monooctyltin thiodipropionate, monooctyltin tris(isooctylthioglycolic acid ester), monophenyltin triacetate, dimethyltin maleic acid ester salt, dimethyltin bis(ethylene glycol monothioglycolate), dimethyltin bis(mercaptoacetic acid) salt, dimethyltin bis(3-mercaptopropionic acid) salt, dimethyltin bis(isooctylmercaptoacetate), dibutyltin diacetate, dibutyltin dioctoate, dibutyltin distearate, dibutyltin dilaurate, dibutyltin maleate, dibutyltin maleic acid salt polymer, dibutyltin maleic acid ester salt, dibutyltin bis(mercaptoacetic acid), dibutyltin bis(mercaptoacetic acid alkyl ester) salt, dibutyltin bis(3-mercaptopropionic acid alkoxybutyl ester) salt, dibutyltin bisoctylthioglycol ester salt, dibutyltin (3-mercaptopropionic acid) salt, dioctyltin maleate, dioctyltin maleic acid ester salt, dioctyltin maleate polymer, dioctyltin dilaurate, dioctyltin bis(isooctylmercaptoacetate), dioctyltin bis(isooctylthioglycolic acid ester), dioctyltin bis(3-mercaptopropionic acid) salt and the like.

[Molded Article]

Molded articles such as sheet, film, roll, gear, solid tire, belt, hose, tube, packing material, vibration absorber, shoe sole, sports shoes, machine component, automobile component, sports goods, elastic fiber and the like, which are superior in transparency and cold resistance, can be smoothly produced by molding the thermoplastic polyurethane or thermoplastic polyurethane composition of the present invention. Examples of the molding method include casting and dipping including dissolving thermoplastic polyurethane or a thermoplastic polyurethane composition in a solvent to give a uniform solution, and forming a sheet or film; extrusion molding, injection molding, calendar molding, cast molding, blow molding, inflation molding, foam molding, rotational molding, slush molding including heating, kneading and then molding; and the like.

The obtained molded article may be formed solely from thermoplastic polyurethane or a thermoplastic polyurethane composition, or may be a composite molded article of these and other materials (e.g., laminate structure of thermoplastic polyurethane or a thermoplastic polyurethane composition and other material etc.). The composite molded article can be produced by, for example, insert molding, coextrusion molding and the like.

When a member formed from the thermoplastic polyurethane or thermoplastic polyurethane composition of the present invention is member (X) and a member formed from other material is member (Y), examples of the constitution of the composite molded article include a composite molded article having one member (X) and one member (Y);

a composite molded article having member (X) interlying between two members (Y);

a composite molded article having member (Y) interlying between two members (X);

a composite molded article having member (X) and member (Y) in alternate contact;

and the like.

One or both of the aforementioned member (X) and member (Y) may be like a layer, and therefore, the composite molded article of the present invention may be a laminate structure wherein layer-like member (X) and layer-like member (Y) are laminated. Examples of the constitution of such laminate structure include a two-layer structure having one layer-like member (X) and one layer-like member (Y);

a three-layer structure having layer-like member (X) as an intermediate layer between two layer-like members (Y);

a three-layer structure having layer-like member (Y) as an intermediate layer between two layer-like members (X);

a multi-layer structure having layer-like members (X) and layer-like members (Y) alternately laminated in not less than 4 layers;

and the like.

Examples of the material of the aforementioned member (Y) include polyamide; polyester; polyvinylidene chloride; polyvinyl chloride; polycarbonate; acrylic resin; polyoxymethylene resin; saponified ethylene-vinyl acetate copolymer; copolymer of aromatic vinyl compound and at least one selected from vinyl cyanide compound, conjugated diene and olefin; polyurethane other than the thermoplastic polyurethane of the present invention; styrene-based polymer; polyolefin; and the like. Only one kind of these may be used, or two or more kinds thereof may be used in combination.

The production method of the composite molded article is not particularly limited. Examples of the production method include a method including melt coating member (Y) with the thermoplastic polyurethane or thermoplastic polyurethane composition of the present invention;

a method including introducing the thermoplastic polyurethane or thermoplastic polyurethane composition of the present invention in a molten state between two or more members (Y) and adhering and integrating them;

a method including setting (inserting) member (Y) in a metal mold, filling the thermoplastic polyurethane or thermoplastic polyurethane composition of the present invention in a molten state and adhering and integrating them;

a method including coextrusion molding the thermoplastic polyurethane or thermoplastic polyurethane composition of the present invention and materials constituting member (Y), and adhering and integrating them;

a method including pressing member (X) and member (Y);

a method including adhering and integrating member (X) and member (Y) with an adhesive;

and the like.

Examples of the method of crosslinking a molded article obtained from the thermoplastic polyurethane composition include chemical crosslinking by organic peroxide, water crosslinking by silane, electron beam crosslinking by a radical crosslinking agent and the like. Among these, crosslinking by irradiating ionizing radiation such as accelerated electron beam and the like to the thermoplastic polyurethane composition containing a radical crosslinking agent (i.e., electron beam crosslinking) is preferable from the aspect of the rate of the crosslinking treatment. Such crosslinking treatment can be performed conveniently with high productivity.

When the thermoplastic polyurethane composition is melt molded, since the processing temperature is not less than 180° C. and higher than the decomposition temperature of organic peroxide, chemical crosslinking by organic peroxide sometimes results in crosslinking that excessively proceeded during melt molding. In addition, the amounts to be used and the amount to be crosslinked are sometimes difficult to control in water crosslinking by silane. Also from these reasons, electron beam crosslinking by a radical crosslinking agent is preferable.

Since the thermoplastic polyurethane of the present invention shows a small thickening rate even in melt retention for a long time, it is suitable for molding a melt molded article, and particularly suitable for molding melt extrusion molded articles such as sheet, film, belt, hose, tube, elastic fiber and the like.

EXAMPLES

The present invention is explained in the following by referring to Examples, which are not to be construed as limitative. Respective components and abbreviations used in the Examples and Comparative Examples are as follows.

[Organic Diisocyanate (A)]

MDI: 4,4'-diphenylmethane diisocyanate

[Polymer Polyol (B)]

polyether polyol (b-1) with Mn of less than 1000

PTMG 850: poly(tetramethylene ether) glycol (Mn: 850, manufactured by Mitsubishi Chemical Corporation)

polyether polyol (b-1) with Mn of 1000-5000

PTMG 1000: poly(tetramethylene ether) glycol (Mn: 1000, manufactured by Mitsubishi Chemical Corporation)

PTMG 1500: poly(tetramethylene ether) glycol (Mn: 1500, manufactured by Mitsubishi Chemical Corporation)

PTMG 2000: poly(tetramethylene ether) glycol (Mn: 2000, manufactured by Mitsubishi Chemical Corporation)

PTMG 3000: poly(tetramethylene ether) glycol (Mn: 3000, manufactured by Mitsubishi Chemical Corporation)

PTRMG 2000: poly(trimethylene ether) glycol (Mn: 2000, manufactured by Du Pont)

other polyol (b-2) with Mn of 1000-5000

PMPA 1500: polyester polyol composed of adipic acid and 3-methyl-1,5-pentanediol (Mn: 1500, manufactured by KURARAY CO., LTD.)

PMPA 2000: polyester polyol composed of adipic acid and 3-methyl-1,5-pentanediol (Mn: 2000, manufactured by KURARAY CO., LTD.)

[Chain Extender (C)]

straight chain diol (c-1)

BD: 1,4-butanediol 1,3-PD: 1,3-propanediol (manufactured by Du Pont)

side chain alkyl group-containing diol (c-2)

MPD: 3-methyl-1,5-pentanediol (manufactured by KURARAY CO., LTD.)

1,2-PD: propylene glycol (manufactured by The Dow Chemical Company)

2MPD: 2-methyl-1,3-propanediol (manufactured by Tokyo Chemical Industry Co., Ltd.)

MBD: 2-methyl-1,4-butanediol (manufactured by Tokyo Chemical Industry Co., Ltd.)

[Urethanation Reaction Catalyst]

SN: dibutyltin diacetate

[Crosslinking Agent]

TMPTA: trimethylolpropane triacrylate

TMPTMA: trimethylolpropane trimethacrylate (1) nitrogen atom content, (2) transparency, (3) cold resistance, (4) breaking strength, (5) thickening rate, (6) taber abrasion loss and (7) number average molecular weight of the thermoplastic polyurethanes obtained in the following Examples and Comparative Examples were measured by the following methods. The results thereof are shown in the following tables.

(1) Nitrogen Atom Content

The nitrogen atom content (mass %) of the thermoplastic polyurethanes obtained in the following Examples and Comparative Examples was measured by an elemental analyzer ("2400-2" manufactured by PerkinElmer).

(2) Transparency

The thermoplastic polyurethanes obtained in the following Examples and Comparative Examples were press molded by a press molding machine (temperature 180-200° C.) to produce 20 cm×20 cm×2 mm sheets. Then, the haze of the thermoplastic polyurethane sheets was measured by a transmissometer ("HR-100" manufactured by MURAKAMI COLOR RESEARCH LABORATORY CO., Ltd.).

(3) Cold Resistance

Using the thermoplastic polyurethane sheets obtained in the aforementioned (2), dynamic viscoelasticity was measured ("RHEOVIBRON" manufactured by ORIENTEC Co., LTD., measurement conditions: 11 Hz, pull, 3° C./rain temperature rise), and the cold resistance was evaluated according to the following standard $(E'-1)/(E'-2) \leq 5$ ... cold resistance good (○)

$(E'-1)/(E'-2) > 5$ ... cold resistance bad (x)

wherein (E'-1) is the maximum value of storage elastic modulus at −30-0° C. and (E'-2) is the storage elastic modulus at 25° C.

(4) Breaking Strength

Using the thermoplastic polyurethane sheets obtained in the aforementioned (2), the breaking strength was measured according to JIS K 7311.

(5) Thickening Rate

Using the thermoplastic polyurethane sheets obtained in the aforementioned (2), dynamic viscoelasticity at 180-200° C. was measured (measurement apparatus: "RDA-III" manufactured by Rheometric Scientific, measurement conditions: 1 Hz, Shear: 10%), and the thickening rate was calculated from the following formula based on the obtained $G_0'$ (shear elastic modulus immediately after the start of measurement) and G' (shear elastic modulus after 1 hr of melt retention).

thickening rate=$G'/G_0'$ (6) Taber Abrasion Loss

Using a metal mold having a mirror-finished surface, disciform molded articles (diameter 120 mm, thickness 2 mm) were produced by injection molding (FS-80S12ASE manufactured by NISSEI PLASTIC INDUSTRIAL CO., LTD., cylinder temperature 190-220° C., metal mold temperature 30° C., injection time 5-8 sec, cooling time 30 sec) from the thermoplastic polyurethanes obtained in the following Examples and Comparative Examples, the obtained molded articles were left standing at 25° C. for 3 days, and taber abrasion loss was measured using a taber abrasion tester (load 1 kg, wear ring H-22) according to JIS K 7311.

(7) Number Average Molecular Weight

The number average molecular weight of the thermoplastic polyurethanes obtained in the following Examples and Comparative Examples was measured by GPC using a differential refractometer detector ("RID6A" manufactured by Shimadzu Corporation) and high performance liquid chromatography (HPLC) ("LC-9A" manufactured by Shimadzu Corporation, column: "Shodex KD-806M" and "Shodex KD-802.5" manufactured by Tosoh Corporation are connected, eluent: dimethylformamide, standard sample: polystyrene).

Example 1

Poly(tetramethylene ether) glycol (PTMG2000) 74.2 mass % containing 20 mass ppm of SN, 4,4'-diphenylmethane diisocyanate (MDI) 21.4 mass %, 1,4-butanediol (BD) 3.9 mass % and 3-methyl-1,5-pentanediol (MPD) 0.6 mass % at these proportions were continuously supplied all at once in a liquid state by a quantification pump into a twin-screw extruder (L/D=34; φ=30 mm) under heating, and polymerization was performed at 260° C. to give thermoplastic polyurethane.

Examples 2-18

In the same manner as in Example 1 except that the kind and ratio of the starting materials of thermoplastic polyurethane were changed as shown in Table 1, the materials were continuously supplied into a twin-screw extruder, and polymerization was performed at 260° C. to give thermoplastic polyurethane.

Comparative Examples 1-14

In the same manner as in Example 1 except that the kind and ratio of the starting materials of thermoplastic polyurethane were changed as shown in Table 2, the materials were continuously supplied into a twin-screw extruder, and polymerization was performed at 260° C. to give thermoplastic polyurethane.

Tables 1 and 2 describe kind and proportion (mass %) of organic diisocyanate (A), polymer polyol (B) and chain extender (C);

molar ratio when polymer polyol (B) contains two kinds of polyols;

molar ratio of two kinds of diols in chain extender (C); and nitrogen atom content (mass %) of the obtained thermoplastic polyurethanes.

TABLE 1

| | organic diisocyanate (A) (MDI) (%) | polymer polyol (B) | | | chain extender (C) | | | nitrogen atom content (%) |
|---|---|---|---|---|---|---|---|---|
| | | kind | proportion (%) | molar ratio | kind | proportion (%) | molar ratio | |
| Ex. 1 | 21.4 | PTMG2000 | 74.2 | — | BD | 3.9 | 90 | 2.39 |
| | | | | | MPD | 0.6 | 10 | |
| Ex. 2 | 23.3 | PTMG2000 | 71.0 | — | BD | 3.6 | 70 | 2.62 |
| | | | | | MPD | 2.0 | 30 | |
| Ex. 3 | 21.5 | PTMG2000 | 73.8 | — | BD | 3.5 | 80 | 2.41 |
| | | | | | MPD | 1.2 | 20 | |
| Ex. 4 | 22.7 | PTMG2000 | 72.6 | — | BD | 4.4 | 90 | 2.53 |
| | | | | | 1,2-PD | 0.4 | 10 | |
| Ex. 5 | 26.9 | PTMG1500 | 67.4 | — | BD | 5.3 | 95 | 3.01 |
| | | | | | MPD | 0.4 | 5 | |
| Ex. 6 | 13.5 | PTMG3000 | 84.0 | — | BD | 1.6 | 70 | 1.51 |
| | | | | | MPD | 0.9 | 30 | |
| Ex. 7 | 21.4 | PTRMG2000 | 74.0 | — | BD | 3.5 | 80 | 2.40 |
| | | | | | MPD | 1.1 | 20 | |
| Ex. 8 | 21.0 | PTMG2000 | 74.7 | 80.0 | BD | 3.8 | 90 | 2.35 |
| | | PMPA2000 | 14.9 | 20.0 | MPD | 0.5 | 10 | |
| Ex. 9 | 21.8 | PTMG2000 | 73.5 | — | BD | 4.1 | 90 | 2.44 |
| | | | | | MPD | 0.6 | 10 | |
| Ex. 10 | 20.6 | PTMG2000 | 75.3 | — | BD | 3.6 | 90 | 2.30 |
| | | | | | MPD | 0.5 | 10 | |
| Ex. 11 | 22.4 | PTMG2000 | 72.9 | 90.0 | BD | 4.3 | 90 | 2.50 |
| | | | 7.3 | 10.0 | 2MPD | 0.5 | 10 | |
| Ex. 12 | 21.7 | PTMG2000 | 73.7 | 85.0 | BD | 4.0 | 90 | 2.43 |
| | | | 11.1 | 15.0 | MBD | 0.5 | 10 | |
| Ex. 13 | 20.6 | PTMG2000 | 75.4 | 80.0 | BD | 3.8 | 95 | 2.30 |
| | | PMPA2000 | 15.1 | 20.0 | MPD | 0.3 | 5 | |
| Ex. 14 | 25.1 | PTMG1500 | 70.0 | 80.0 | BD | 4.6 | 95 | 2.81 |
| | | PMPA1500 | 14.0 | 20.0 | MPD | 0.3 | 5 | |
| Ex. 15 | 22.8 | PTMG2000 | 72.1 | 75.0 | BD | 4.4 | 90 | 2.55 |
| | | PMPA2000 | 18.0 | 25.0 | MPD | 0.6 | 10 | |
| Ex. 16 | 22.1 | PTRMG2000 | 73.0 | 90.0 | BD | 4.0 | 85 | 2.48 |
| | | PMPA2000 | 7.3 | 10.0 | MPD | 0.9 | 15 | |
| Ex. 17 | 21.5 | PTMG2000 | 74.2 | 75.0 | BD | 3.7 | 85 | 2.40 |
| | | PMPA2000 | 18.6 | 25.0 | 1,2-PD | 0.6 | 15 | |
| Ex. 18 | 24.1 | PTMG1500 | 71.4 | 85.0 | BD | 3.9 | 90 | 2.70 |
| | | PMPA1500 | 10.7 | 15.0 | MBD | 0.5 | 10 | |

(remark)
% = mass %

TABLE 2

| | organic diisocyanate (A) (MDI) (%) | polymer polyol (B) | | | chain extender (C) | | | nitrogen atom content (%) |
|---|---|---|---|---|---|---|---|---|
| | | kind | proportion (%) | molar ratio | kind | proportion (%) | molar ratio | |
| Com. Ex. 1 | 22.5 | PTMG2000 | 72.8 | — | BD | 4.8 | — | 2.51 |
| Com. Ex. 2 | 21.5 | PTMG2000 | 74.1 | — | BD | 4.3 | 98 | 2.40 |
| | | | | | MPD | 0.1 | 2 | |
| Com. Ex. 3 | 21.6 | PTMG2000 | 73.3 | — | BD | 2.2 | 50 | 2.43 |
| | | | | | MPD | 2.9 | 50 | |
| Com. Ex. 4 | 40.2 | PTMG2000 | 47.1 | — | BD | 11.1 | 90 | 4.51 |
| | | | | | MPD | 1.6 | 10 | |
| Com. Ex. 5 | 21.8 | PTMG2000 | 73.7 | — | BD | 4.1 | 90 | 2.44 |
| | | | | | 1,3-PD | 0.4 | 10 | |
| Com. Ex. 6 | 44.6 | PTMG850 | 43.7 | — | BD | 10.2 | 90 | 5.00 |
| | | | | | MPD | 1.5 | 10 | |
| Com. Ex. 7 | 22.4 | PTMG3000 | 71.7 | — | BD | 5.8 | 98 | 2.50 |
| | | | | | MPD | 0.2 | 2 | |
| Com. Ex. 8 | 21.5 | PTRMG2000 | 74.2 | — | BD | 4.4 | — | 2.40 |

TABLE 2-continued

| | organic diisocyanate | polymer polyol (B) | | | chain extender (C) | | | nitrogen atom |
|---|---|---|---|---|---|---|---|---|
| | (A) (MDI) (%) | kind | proportion (%) | molar ratio | kind | proportion (%) | molar ratio | content (%) |
| Com. Ex. 9 | 22.3 | PTRMG2000 | 72.2 | — | BD | 2.4 | 50 | 2.51 |
| | | | | | MPD | 3.1 | 50 | |
| Com. Ex. 10 | 25.1 | PTMG2000 | 69.1 | 80.0 | BD | 5.9 | — | 2.80 |
| | | PMPA2000 | 13.8 | 20.0 | | | | |
| Com. Ex. 11 | 11.6 | PTMG3000 | 86.7 | — | BD | 1.3 | 80 | 1.30 |
| | | | | | MPD | 0.4 | 20 | |
| Com. Ex. 12 | 47.6 | PTMG1500 | 38.0 | 70.0 | BD | 12.6 | 85 | 5.30 |
| | | PMPA1500 | 11.4 | 30.0 | 1,2-PD | 1.9 | 15 | |
| Com. Ex. 13 | 43.7 | PTMG2000 | 42.2 | 85.0 | BD | 12.4 | 90 | 4.90 |
| | | PMPA2000 | 6.3 | 15.0 | MBD | 1.6 | 10 | |
| Com. Ex. 14 | 42.0 | PTMG2000 | 44.9 | 70.0 | BD | 10.5 | 80 | 4.70 |
| | | PMPA2000 | 13.5 | 30.0 | 2MPD | 2.6 | 20 | |

(remark)
% = mass %

TABLE 3

| | polyurethane | property of molded article | | | | |
|---|---|---|---|---|---|---|
| | number average molecular weight ($\times 10^4$) | cold resistance | transperency (haze) | breaking strength (MPa) | taber abrasion loss (mg) | moldability thickening rate |
| Ex. 1 | 22.4 | ○ | 10 | 36 | 12 | 1.6 |
| Ex. 2 | 23.1 | ○ | 9 | 30 | 15 | 1.8 |
| Ex. 3 | 20.1 | ○ | 10 | 33 | 13 | 1.5 |
| Ex. 4 | 19.5 | ○ | 8 | 35 | 13 | 1.7 |
| Ex. 5 | 24.1 | ○ | 7 | 39 | 18 | 1.8 |
| Ex. 6 | 18.5 | ○ | 10 | 30 | 15 | 1.3 |
| Ex. 7 | 19.3 | ○ | 10 | 35 | 11 | 1.4 |
| Ex. 8 | 17.8 | ○ | 9 | 33 | 10 | 1.1 |
| Ex. 9 | 19.3 | ○ | 7 | 35 | 12 | 1.3 |
| Ex. 10 | 21.5 | ○ | 10 | 34 | 14 | 1.4 |
| Ex. 11 | 20.3 | ○ | 6 | 38 | 13 | 1.2 |
| Ex. 12 | 18.3 | ○ | 8 | 35 | 12 | 1.2 |
| Ex. 13 | 19.3 | ○ | 8 | 34 | 15 | 1.1 |
| Ex. 14 | 22.4 | ○ | 7 | 37 | 16 | 1.2 |
| Ex. 15 | 21.1 | ○ | 9 | 38 | 17 | 1.3 |
| Ex. 16 | 23.8 | ○ | 10 | 38 | 16 | 1.2 |
| Ex. 17 | 19.8 | ○ | 7 | 35 | 13 | 1.2 |
| Ex. 18 | 22.5 | ○ | 10 | 39 | 18 | 1.3 |

TABLE 4

| | polyurethane | property of molded article | | | | |
|---|---|---|---|---|---|---|
| | number average molecular weight ($\times 10^4$) | cold resistance | transperency (haze) | breaking strength (MPa) | taber abrasion loss (mg) | moldability thickening rate |
| Com. Ex. 1 | 21.4 | X | 8 | 40 | 18 | 1.7 |
| Com. Ex. 2 | 18.2 | X | 8 | 38 | 16 | 1.5 |
| Com. Ex. 3 | 19.1 | ○ | 9 | 18 | 19 | 1.5 |
| Com. Ex. 4 | 28.3 | X | 89 | 56 | 29 | 83 |
| Com. Ex. 5 | 22.1 | X | 9 | 35 | 18 | 1.5 |
| Com. Ex. 6 | 25.1 | X | 10 | 57 | 30 | 170 |
| Com. Ex. 7 | 21.3 | X | 85 | 45 | 22 | 3.3 |
| Com. Ex. 8 | 18.1 | X | 8 | 38 | 17 | 1.5 |
| Com. Ex. 9 | 22.1 | ○ | 7 | 16 | 16 | 1.6 |
| Com. Ex. 10 | 23.5 | X | 26 | 40 | 22 | 43 |
| Com. Ex. 11 | 18.5 | ○ | 6 | 15 | 15 | 1.3 |
| Com. Ex. 12 | 26.9 | X | 78 | 49 | 33 | 133 |
| Com. Ex. 13 | 25.3 | X | 83 | 54 | 28 | 141 |
| Com. Ex. 14 | 24.5 | X | 87 | 52 | 35 | 78 |

From the results shown in Tables 3 and 4, it is clear that the molded articles obtained from the thermoplastic polyurethanes of Examples 1-18 are superior in transparency and cold resistance, have high breaking strength, and also superior in mechanical property. In addition, the thermoplastic polyurethanes of Examples 1-18 show a small thickening rate. Furthermore, the thermoplastic polyurethanes of Examples 8 and 13-18 containing polyether polyol (b-1) having Mn of 1000-5000 and other polyol (b-2) having Mn of 1000-5000 (i.e., polyester polyol) as polymer polyol (B) show a particularly-suppressed small thickening rate.

In contrast, the thermoplastic polyurethanes of Comparative Examples 1, 5, 8 and 10, which were obtained without using side chain alkyl group-containing diol (c-2) as chain extender (C) but using straight chain diol (c-1) alone, showed insufficient cold resistance of the molded articles. Moreover, Comparative Examples 2 and 7, wherein the molar ratio of straight chain diol (c-1) and side chain alkyl group-containing diol (c-2) as chain extender (C) is outside the range of the present invention (i.e., proportion of side chain alkyl group-containing diol (c-2) is small), showed insufficient cold resistance of the molded articles. Comparative Examples 4, 6 and 12-14, wherein the nitrogen atom content of thermoplastic polyurethane exceeds the range of the present invention, showed insufficient cold resistance of the molded articles and markedly high thickening rates. Comparative Examples 3 and 9, wherein the molar ratio of straight chain diol (c-1) and side chain alkyl group-containing diol (c-2) as chain extender (C) is outside the range of the present invention (i.e., proportion of side chain alkyl group-containing diol (c-2) is high), showed low breaking strength. Comparative Example 11, wherein the nitrogen atom content of thermoplastic polyurethane is lower than the range of the present invention showed low breaking strength.eb Examples 19-26

In the same manner as in Example 1 except that the kind and ratio of the starting materials of thermoplastic polyurethane were changed as shown in Table 5, the materials were continuously supplied into a twin-screw extruder, and polymerization was performed at 260° C. to give thermoplastic polyurethane. Here, 3-10 parts by mass of the crosslinking agent shown in Table 5 per 100 parts by mass of the obtained thermoplastic polyurethane was melt kneaded in a twin-screw extruder at 200° C. to give a thermoplastic polyurethane composition.

The aforementioned thermoplastic polyurethane composition was molded into a 0.5 mm-thick sheet by press molding, an electron beam (accelerating voltage 200 kV, exposure dose 200 kGy) was irradiated on the sheet by an electron beam accelerator [manufactured by Nissin-High Voltage Co., Ltd., model name "Cure Tron EB200-100"] to perform crosslinking to give a crosslinked sheet (crosslinked molded article). In the same manner as above except that the crosslinked sheet was used instead of the aforementioned thermoplastic polyurethane sheet, cold resistance, transparency and breaking strength were measured. A disciform sheet was formed from the obtained crosslinked sheet and, in the same manner as above except that the disciform sheet was used instead of the aforementioned disciform molded article, taber abrasion loss was measured. The results thereof are shown in the following Table 6.

Table 5 describes kind and proportion (mass %) of organic diisocyanate (A), polymer polyol (B) and chain extender (C);

molar ratio when polymer polyol (B) contains two kinds of polyols;

molar ratio of two kinds of diols in chain extender (C);

nitrogen atom content (mass %) of the obtained thermoplastic polyurethanes; and kind of crosslinking agent and the amount of a crosslinking agent used (parts by mass) per 100 parts by mass of the thermoplastic polyurethane.

TABLE 5

| | organic diisocyanate (A) (MDI) (%) | polymer polyol (B) | | | chain extender (C) | | | nitrogen atom content (%) | crosslinking agent | |
|---|---|---|---|---|---|---|---|---|---|---|
| | | kind | proportion (%) | molar ratio | kind | proportion (%) | molar ratio | | TMPTA (part) | TMPTMA (part) |
| Ex. 19 | 21.4 | PTMG 2000 | 74.2 | — | BD MPD | 3.9 0.6 | 90 10 | 2.39 | 3 | — |
| Ex. 20 | 22.7 | PTMG 2000 | 72.6 | — | BD 1,2-PD | 4.4 0.4 | 90 10 | 2.53 | 3 | — |
| Ex. 21 | 25.1 | PTMG 1500 PMPA 1500 | 70.0 14.0 | 80.0 20.0 | BD MPD | 4.6 0.3 | 95 5 | 2.81 | 5 | — |
| Ex. 22 | 22.1 | PTRMG 2000 PMPA 2000 | 73.0 7.3 | 90.0 10.0 | BD MPD | 4.0 0.9 | 85 15 | 2.48 | 10 | — |
| Ex. 23 | 26.9 | PTMG 1500 | 67.4 | — | BD MPD | 5.3 0.4 | 95 5 | 3.01 | — | 3 |
| Ex. 24 | 21.0 | PTMG 2000 PMPA 2000 | 74.7 14.9 | 80.0 20.0 | BD MPD | 3.8 0.5 | 90 10 | 2.35 | — | 5 |
| Ex. 25 | 20.7 | PTMG 2000 | 75.1 | — | BD MBD | 3.7 0.5 | 90 10 | 2.32 | — | 5 |

TABLE 5-continued

| | organic diisocyanate (A) (MDI) (%) | polymer polyol (B) kind | proportion (%) | molar ratio | chain extender (C) kind | proportion (%) | molar ratio | nitrogen atom content (%) | crosslinking agent TMPTA (part) | TMPTMA (part) |
|---|---|---|---|---|---|---|---|---|---|---|
| Ex. 26 | 20.6 | PTMG 2000 | 75.4 | 80.0 | BD | 3.8 | 95 | 2.30 | — | 10 |
| | | PMPA 2000 | 15.1 | 20.0 | MPD | 0.3 | 5 | | | |

(remark)
% = mass %,
part = part by mass

TABLE 6

| | property of molded article | | | |
|---|---|---|---|---|
| | cold resistance | transparency (haze) | breaking strength (MPa) | taber abrasion loss (mg) |
| Ex. 19 | ○ | 9 | 40 | 7 |
| Ex. 20 | ○ | 8 | 40 | 8 |
| Ex. 21 | ○ | 7 | 43 | 6 |
| Ex. 22 | ○ | 8 | 48 | 4 |
| Ex. 23 | ○ | 7 | 45 | 8 |
| Ex. 24 | ○ | 8 | 43 | 6 |
| Ex. 25 | ○ | 8 | 45 | 5 |
| Ex. 26 | ○ | 8 | 47 | 4 |

From the results shown in Table 6, it is clear that the crosslinked molded articles obtained from the thermoplastic polyurethane compositions of Examples 19-26 are superior in transparency and cold resistance, and further superior in the breaking strength and taber abrasion loss to the uncrosslinked molded articles obtained from the thermoplastic polyurethanes of Examples 1-18.

INDUSTRIAL APPLICABILITY

The thermoplastic polyurethane of the present invention is superior in transparency and cold resistance, showing a small thickening rate even in melt retention for a long time, and further superior in abrasion resistance and mechanical property. Various products such as sheet, film, roll, gear, solid tire, belt, hose, tube, packing material, vibration absorber, shoe sole, sports shoes, machine component, automobile component, sports goods, elastic fiber and the like, which are superior in transparency and cold resistance, can be produced from the thermoplastic polyurethane or thermoplastic polyurethane composition of the present invention.

This application is based on patent application Nos. 2012-173678 and 2012-261216 filed in Japan, the contents of which are incorporated in full herein.

The invention claimed is:

1. A thermoplastic polyurethane composition comprising:
   a thermoplastic polyurethane obtained by reacting
      an organic diisocyanate (A),
      a polymer polyol (B) having a number average molecular weight (Mn) of from 1000 to 5000, and
      a chain extender (C), and
   from 1 to 20 parts by mass of a crosslinking agent relative to 100 parts by mass of the thermoplastic polyurethane, wherein:
   the chain extender (C) comprises a straight chain diol (c-1) and a side chain alkyl group-containing diol (c-2);
   a molar ratio of the straight chain diol (c-1) and the side chain alkyl group-containing diol (c-2), straight chain diol (c-1)/side chain alkyl group-containing diol (c-2), in the chain extender (C) is from 97/3 to 60/40;
   the thermoplastic polyurethane has a nitrogen atom content of from 1.5 mass % to less than 4.0 mass %; and
   the crosslinking agent is an organic peroxide, a silane compound, or a radical crosslinking agent.

2. The thermoplastic polyurethane composition according to claim 1, wherein a proportion of the organic diisocyanate (A) in the thermoplastic polyurethane is not more than 30 mass %.

3. The thermoplastic polyurethane composition according to claim 1, wherein the organic diisocyanate (A) is 4,4'-diphenylmethane diisocyanate.

4. The thermoplastic polyurethane composition according to claim 1, wherein the polymer polyol (B) is a polyether polyol (b-1), or comprises the polyether polyol (b-1) and other polyol (b-2), and such that a molar ratio of the other polyol (b-2) and the polyether polyol (b-1) (other polyol (b-2)/polyether polyol (b-1)) is 0/100-40/60.

5. The thermoplastic polyurethane composition according to claim 4, wherein the polymer polyol (B) comprising the polyether polyol (b-1) and the other polyol (b-2) which is a polyester polyol.

6. The thermoplastic polyurethane composition according to claim 5, wherein a polyol component constituting the polyester polyol is a side chain alkyl group-containing diol (d).

7. The thermoplastic polyurethane composition according to claim 6, wherein the side chain alkyl group-containing diol (d) is 3-methyl-1,5-pentanediol.

8. The thermoplastic polyurethane composition according to claim 1, wherein:
   the straight chain diol (c-1) is 1,4-butanediol; and
   the side chain alkyl group-containing diol (c-2) is a diol represented by formula (I):

$$\text{HO—}(CR^1R^2)_l\text{-}(CR^3R^4)_m\text{-}(CR^5R^6)_n\text{-OH} \qquad (I)$$

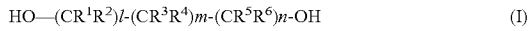

wherein:
   $R^1$, $R^2$, $R^3$, $R^4$, $R^5$ and $R^6$ are each independently a hydrogen atom or an alkyl group, such that at least one of $R^1$, $R^2$, $R^3$, $R^4$, $R^5$ and $R^6$ is an alkyl group; and
   l, m and n are each independently an integer of not less than 0 satisfying relationships of $l+n \geq 1$ and $2 \leq l+m+n \leq 10$.

9. The thermoplastic polyurethane composition according to claim 8, wherein the side chain alkyl group-containing diol (c-2) is at least one selected from the group consisting of propylene glycol, 3-methyl-1,5-pentanediol, 2-methyl-1,3-propanediol and 2-methyl-1,4-butanediol.

10. The thermoplastic polyurethane composition according to claim 8, wherein the side chain alkyl group-containing diol (c-2) is propylene glycol, 3-methyl-1,5-pentanediol, or both.

11. A molded article, comprising the thermoplastic polyurethane composition according to claim 1.

12. A crosslinked molded article obtained by crosslinking the molded article according to claim 11.

13. The thermoplastic polyurethane composition according to claim 1, wherein the crosslinking agent is a radical crosslinking agent.

14. The thermoplastic polyurethane composition according to claim 1, wherein the radical crosslinking agent is at least one selected from the group consisting of trimethylolpropane triacrylate, trimethylolpropane trimethacrylate, and triacryl formal.

15. The thermoplastic polyurethane composition according to claim 1, wherein the crosslinking agent is at least one organic peroxide selected from the group consisting of alkylperoxide, arylperoxide, peroxyester, peroxycarbonate, diacylperoxide, peroxyketal, and cyclic peroxide.

16. The thermoplastic polyurethane composition according to claim 1, wherein the crosslinking agent is at least one silane compound selected from the group consisting of vinyltrimethoxysilane, vinyltriethoxysilane, vinyltris(2-methoxyethoxy)silane, vinyltriacetoxysilane, vinylmethyldimethoxysilane, and 3-methacryloyloxypropyltrimethoxysilane.

* * * * *